United States Patent [19]

Shimizu et al.

[11] Patent Number: 5,497,452
[45] Date of Patent: Mar. 5, 1996

[54] METHOD AND APPARATUS FOR GENERATING A GEOMETRIC MODEL

[75] Inventors: Shuichi Shimizu, Yokohama; Masayuki Numao, Kawasaki, both of Japan

[73] Assignee: International Business Machines Corporation, Armonk, N.Y.

[21] Appl. No.: 844,345

[22] Filed: Mar. 2, 1992

[30] Foreign Application Priority Data

Mar. 14, 1991 [JP] Japan .................................. 3-103716

[51] Int. Cl.$^6$ ..................................... G06F 17/50
[52] U.S. Cl. ................................. 395/120; 395/119
[58] Field of Search ................................. 395/118, 119, 395/120

[56] References Cited

U.S. PATENT DOCUMENTS

| | | | |
|---|---|---|---|
| 4,868,766 | 9/1989 | Oosterholt | 395/120 |
| 4,888,711 | 12/1989 | Nguyen | 395/120 |
| 4,893,260 | 1/1990 | Arakawa | 395/120 X |
| 5,006,991 | 4/1991 | Ohcoshi et al. | 395/120 X |
| 5,010,501 | 4/1991 | Arakawa | 395/120 |
| 5,265,197 | 11/1993 | Kondo | 395/120 |

Primary Examiner—Heather R. Herndon
Assistant Examiner—Cliff N. Vo
Attorney, Agent, or Firm—Ronald L. Drumheller

[57] ABSTRACT

A method and apparatus are described by which a geometric model accurately reflecting the intention of the designer can be simply constructed in the generation or modification of a geometric model, without any constraint on operation such as an input order. Using geometric elements (planes, sides, vertexes, etc.) and geometric constraints (size, angle, etc.) between the elements as inputs, bidirectional dependency relation expressions for these geometric elements are created in a dependency relation expression generating mechanism of a geometric reasoning module, and based upon the expressions dependency conditions (dependency order data) are automatically calculated in a dependency order calculating mechanism. Then, attribute values of the geometric elements are determined in a geometric attribute calculating mechanism, and a geometric model is generated in a modeler and outputted to a display device. In order to modify the model, the geometric element to be subjected to a modification process is calculated using memory dependency order data in a conflict detecting and resolving mechanism, and the attribute value of the element is determined. In addition, excessive and conflict geometric constraints are detected, and a conflict resolving action is presented on the display device.

18 Claims, 12 Drawing Sheets

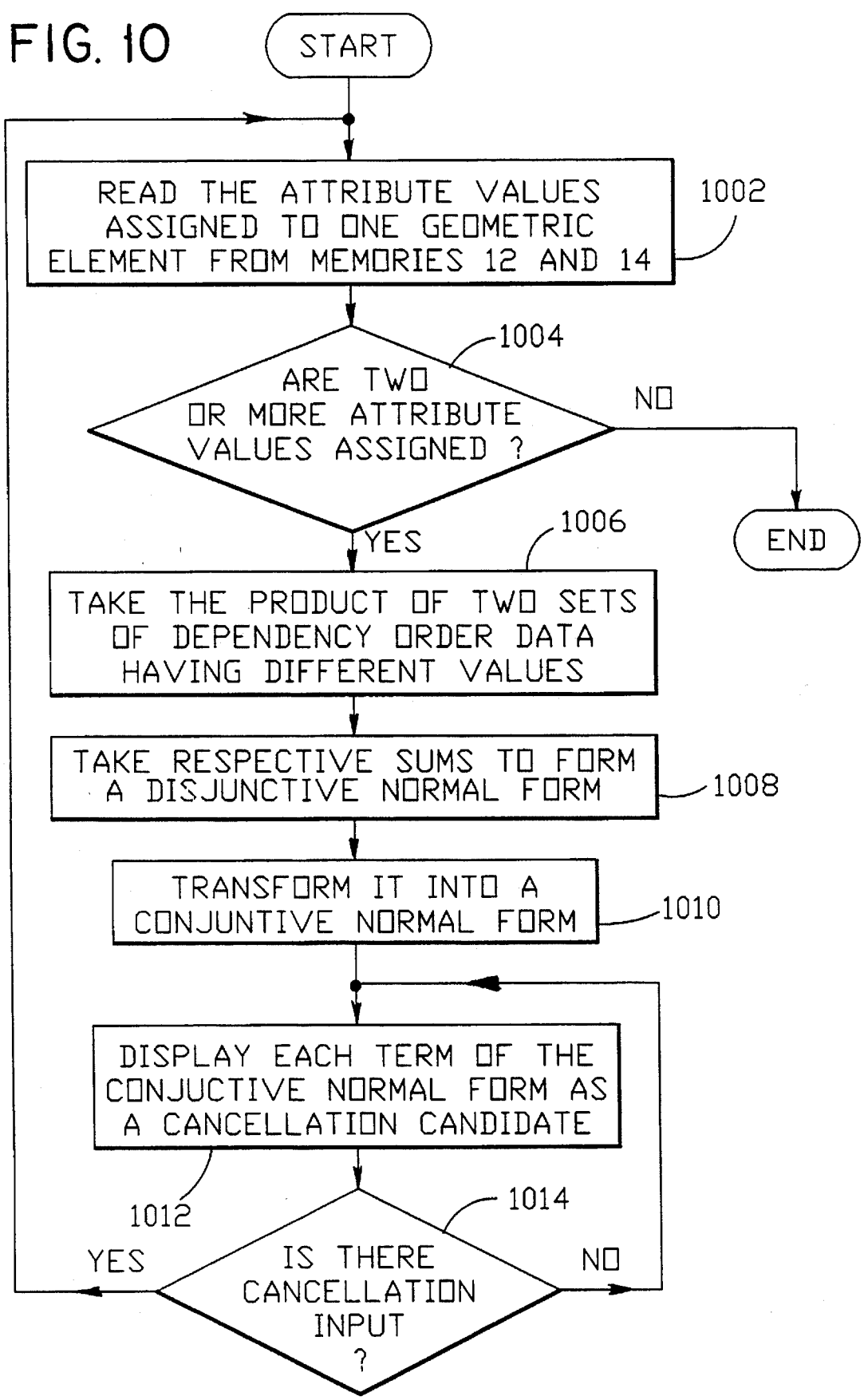

ical model which is suitable for a CAD (Computer Aided Design) system for machine design.

METHOD AND APPARATUS FOR GENERATING A GEOMETRIC MODEL

BACKGROUND OF THE INVENTION

The present invention is related to a method and apparatus for generating a geometric model, and particularly to a method and apparatus for generating a geometric model which is suitable for a CAD (Computer Aided Design) system for machine design.

The main object of a CAD system is to construct a graphic shape of a design objective in a computer. This shape expression is called a "geometric model." In the conventional CAD system, a geometric model is generated mainly by set operations of a solid. That is, first the geometry of each basic solid is determined in a local coordinate system, then a positioning is made in a space by an operation such as movement/rotation, and finally set operations such as sum, difference and product are performed between them.

In accordance with this method, if a step is cut in part of a block for instance, the shape to be cut out should be determined first in conformity with the block which is a base. Namely, it is necessary to calculate the shape of the step while referencing the parameters (such as distance between the planes) of the shape to the base. Apart from the intention of a designer to cut out stepwise, specification of the geometric data in detail is essential. This is a large burden to the designer. In addition, even if the size of the part to be cut out is not important, but the size of the part remaining is important, the size must be converted to the geometric data of the step and specified. That is, size specification different from the designer's intention may be required. Furthermore, if the values of the specified shape and size are inconsistent, it is often difficult to grasp and solve its cause.

In contradistinction to this, as a system accurately reflecting the designer's intention, attention is being paid to a CAD system based on constraints. That is, a system which calculates a geometric model using the relationship between basic solids, for instance, coincidence of planes or the distance between edges as an input. Such a relative relationship is called "geometric constraint." It can be said that specification by "structural constraint" such as parallelism or coincidence or "size constraint" such as inter-plane distance directly reflects the designer's intention.

For instance, in Japanese Published Unexamined Patent Application No. 02-186482, there is disclosed a method for generating a geometric model in which geometric constraints can easily be inputted by design commands. In the correction mode, variable values are substituted in the order of input. However, correction of the shape is allowed only by changing the values defined when inputted, and the constraint itself cannot be changed. In addition, since the order of the correction process is fixed by the order of input, a necessary and minimum modification process cannot be performed.

Also, in Japanese Published Unexamined Patent Application No. 62-272366, there is disclosed a graphic information processing system which indirectly holds geometric attribute values such as coordinate values using a pointer. By making geometric values common to a plurality of geometric elements, the attribute values of a plurality of geometric elements can simultaneously be modified in one correction process. However, if the order of tracing of the pointer is fixed, the extent covered by the modification process is limited, and a solution can be obtained as a shape. A correct result may not be achieved. Further, inconsistency in the value of size and the like cannot be handled.

Further, in Japanese Published Unexamined Patent Application No. 02-83782, there is disclosed a graphic information processing system wherein geometric constraint relations are generated by selection of basic solids and relative definition of geometric elements (such as inter-plane distance), and correction, modification and classification are performed on the basis of the geometric constraint relations. In this system, however, dependency relations are not fixed, and thus identification of the fixed planes which are not changed is not uniquely given. If the selection of the fixed planes is not proper, the system does no more than display the constraint relations that are not satisfied, and no measures are presented for resolving the inconsistency. In addition, since only plane information is treated, geometric specification of sides and vertexes cannot be done.

SUMMARY OF THE INVENTION

There is no conventional CAD system which can flexibly adapt to a design and its modification in this way. Geometric constraints may cause inconsistency in the size relation and the like, but a CAD system has not yet been developed which can detect and resolve the conflict between such geometric constraints.

It is an object of the present invention therefore to provide a method and apparatus wherein a geometric model accurately reflecting the intention of the designer can easily be built without having any constraint on the operation such as the input order in generation or modification of the geometric model.

It is a further object of the present invention to enable necessary and minimum modifications satisfying all the geometric constraints to automatically be performed on the basis of the dependency relation information between the modified constraints and the shape in modification of a geometric model, thereby greatly reducing the burden on the designer.

It is a further object of the present invention to provide a method wherein, if there is an inconsistency between the constraints at the time of inputting or modification and a shape cannot uniquely be determined, not only such inconsistency can be detected, but also a constraint cancellation candidate for resolving the conflict can be presented to the designer.

The present invention accomplishes the above objects by a geometric definition according to a dependency condition calculation technique using bidirectional geometric dependency relations.

That is, with geometric elements (planes, sides, vertexes, etc.) and the geometric constraints between them (size, angle, etc.) as an input, the bidirectional dependency relation expressions for the geometric elements are created in a geometric reasoning module, and based thereon, dependency conditions (dependency order data) are automatically calculated. Then, the attribute values of the geometric elements are determined, and a geometric model is generated by a modeler and outputted to a display device. For performing modifications, the geometric elements to be subjected to a modification process are calculated using the dependency order data and the attribute values of the geometric elements are determined.

In accordance with another object of the present invention, using the attribute values of the geometric elements and the dependency order data, excessive or conflicting geometric constraints are detected and the means for resolving them is presented on a display device.

In accordance with a preferred embodiment of the present invention, the geometric constraints given between geometric elements are replaced by dependency relation expressions of ATMS (Assumption-based Truth Maintenance System), and using a declarative graph constructed from the expressions, the attribute values of the geometric elements are calculated and excessiveness and conflict are detected.

Further and still other objects of the present invention will become more clearly apparent when the following description is read in conjunction with the accompanying drawings.

BRIEF DESCRIPTION OF THE DRAWINGS

FIG. 10 is a flow diagram illustrating the operation of the conflict detecting and resolving mechanism forming a portion of FIG. 1;

DETAILED DESCRIPTION

Figure 1:
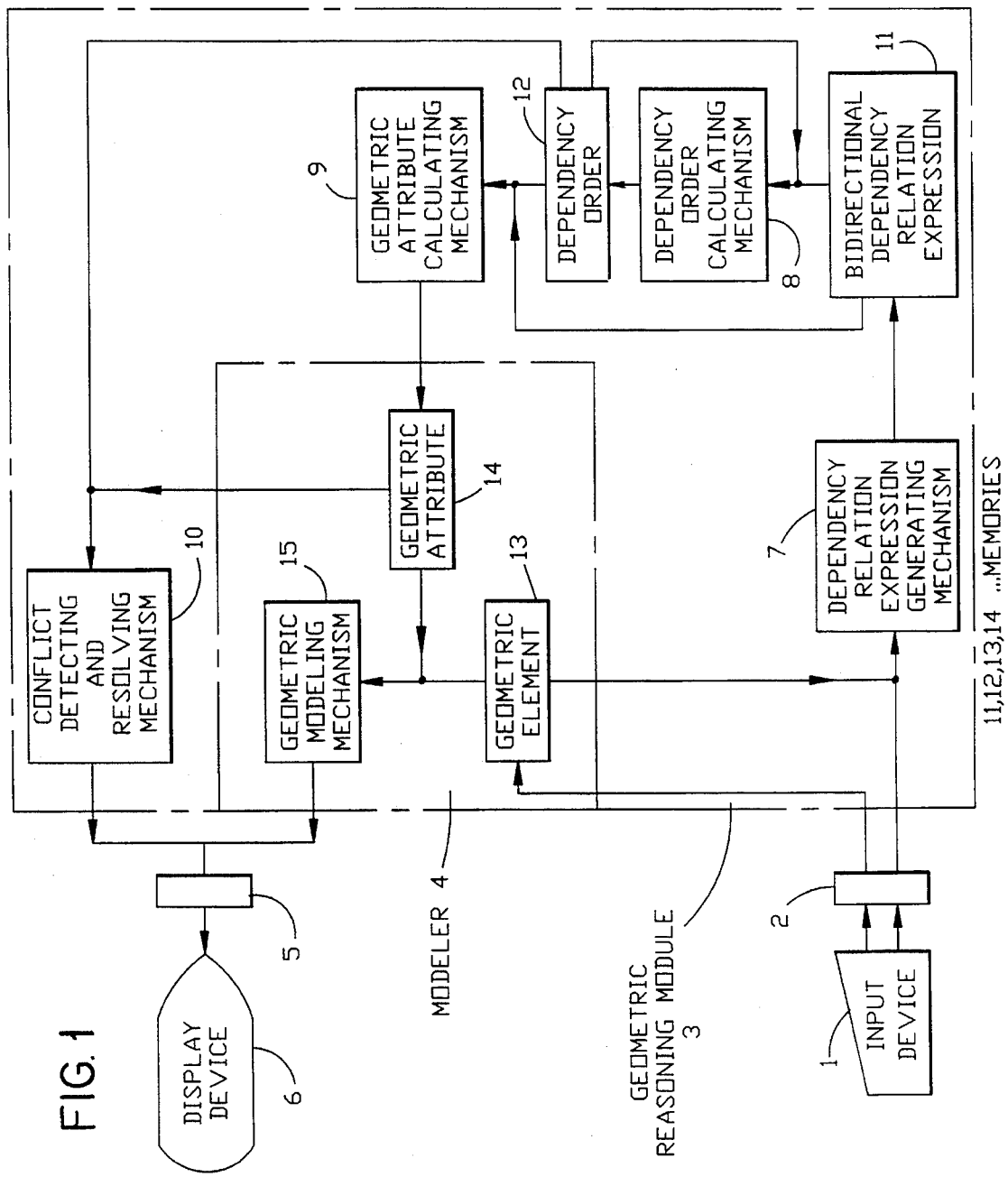
FIG. 1 is a schematic block diagram of a CAD system comprising a preferred embodiment of the present invention.

ATMS employed in the present invention will be briefly explained. ATMS is a database in which the true and false values of data are managed by dependency relation expressions, and is described in detail in the following references.

(1) de Kleer, J., "An Assumption-based Truth Maintenance System," Artificial Intelligence 28, (1986), pp. 127–162.

(2) de Kleer, J., "A General Labeling Algorithm for Assumption-based Truth Maintenance System," 'AAAI Conf., (1988), pp. 188–192.

In ATMS, data is called a "node," and the node is classified into two categories: "assumption" and "derived-fact." Assumption is data which is not supported by anything but itself, and derived-fact is supported by assumptions and other derived-facts. The support relation is given to ATMS by "dependency relation expressions (or justification expression; Justification)." A dependency expression takes the form of a material implication, and means that the logical product on the left side directly supports the right side member. An example of dependency relation expressions is shown below. For convenience, it is assumed that a capital letter represents an assumption and a small letter represents a derived-fact. By its definition, an assumption appears only on the left side of a dependency relation expression.

$A \rightarrow x.$ $B,C \rightarrow Y.$ $x,y \rightarrow z.$ $D \rightarrow z.$

A node is expressed by the following form reflecting a dependency relation.

<Data, label>

Here, a label represents the cause which ultimately supports the node. In the following description, a label is treated as "dependency order data." An assumption is expressed as follows because it is supported only by itself.

<A,{{A}}>,<B,{{B}}>,<C, {{C}}>

Given the above dependency relation expression, the dependency order data of derived-facts x, y and z is calculated as follows.

<x,{{A}}>,<y,{{B,C}}>,<z,{{A, B,C},{D}}>

Thus, the direct product of the dependency order data on the left side of a dependency relation expression becomes the dependency order data on the right side. A set of assumptions is called an environment. For instance, a derived-fact z becomes true in an environment {A, B, C} or an environment {D}. Also, it is true in an environment in which they are complementary sets (e.g., {A, B, C, E, F}). The primary role of ATMS is to calculate this label.

The updating of the dependency order data of a node facilitates the (re)evaluation of the dependency relation expression including the node in the left side thereof, and updates the dependency order data of another node. Since labels are calculated one by one through dependency relation expressions, the calculation method of dependency order data (label) is called a "label propagation algorithm."

One of the important natures of dependency order data is "minimum properties." If the following dependency relation expression is given in addition to the above-mentioned dependency relation expression, the left-side dependency order data is calculated as {{D, E}}, but this environment is not added because a more general environment {D} has already been given in the right-side dependency order data.

$D,E \rightarrow z.$

Accordingly, even if a dependency relation expression constructs a loop of this nature, the label calculation process always stops.

Another important nature of dependency order data is "consistency." In dependency order data, (a set of) denied assumptions are not included. To deny an assumption, a dependency relation expression supporting a special node represents falsity.

B→.

By this expression, the environments including the assumption B are removed from dependency order data.

<B,{ }>><y,{ }>,<z,{{D}}>

Referring now to the figures and to FIG. 1 in particular there is shown an embodiment of the CAD system comprising the present invention. Input device 1, such as a keyboard, provides inputted information through input interface 2 to geometric reasoning module 3 and modeler 4. Geometric reasoning module 3 and modeler 4 are preferably constructed by the processor or memory (including a program memory) of a computer or using a dedicated image processor, and their respective outputs are provided through output interface 5 to output means, such as display device 6.

Geometric reasoning module 3 executes a "geometric reasoning" which converts the intention of the designer expressed by geometric restrictions into "geometric parameters" such as coordinates or equations of planes, and functionally, geometric reasoning module 3 comprises a dependency relation expressing generating mechanism 7, dependency order calculating mechanism 8, geometric attribute calculating mechanism 9 and conflict detecting and resolving mechanism 10. Memory 11 stores bidirectional dependency relation expressions, and memory 12 stores dependency order data.

Modeler 4 includes memory 13 for storing a basic solid geometric element data such as a hexahedron and the geometric elements constituting it, memory 14 for storing the attribute values of the geometric elements (such as coordinates), and geometric modeling mechanism 15 for performing a set operation of sum/difference/product, and calculating and storing the final shape between the basic solids. As the modeler, for instance, publicly known ones such as described in Patent Examined Patent Application No. 63-10470 can be used.

The construction and action of each structural element is described below.

The information (data, command) regarding a basic solid provided from input device 1 and the geometric elements constituting it are inputted via input interface 2 to memory 13 of modeler 4, and the information related to geometric constraints is inputted from input interface 2 to dependency relation expression generating mechanism 7 of geometric reasoning module 3. The information related to the geometric elements include planes (such as f1, f2), vertices (such as v1, v2), sides or edges (such as e1, e2). Also, the information (data) related to geometric constraints include those shown in Table 1.

TABLE 1

| Information on Geometric Constraints | | | |
|---|---|---|---|
| [Type] | [Name] | [Description] | [Set of Arguments] |
| Dimensional constraints | Distance | dist | (v, v), (v, e), (v, f), (e, e), (e, f), (f, f) |
| | Angle | angle | (e, e), (e, f), (f, f) |
| Structural constraints | Coincidence | coin | (v, v), (e, e), (f, f) |
| Topological constraints | On | on | (v, e), (v, f), (e, f) |

The commands of the graphic process include those for the inputting of geometric elements, the inputting of a basic solid such as a hexahedron, set operations, and deletion and modification of constraints. The comments are interactively inputted by the designer via display device 6 and are used in geometric reasoning module 3 to execute "geometric reasoning."

Figure 2:
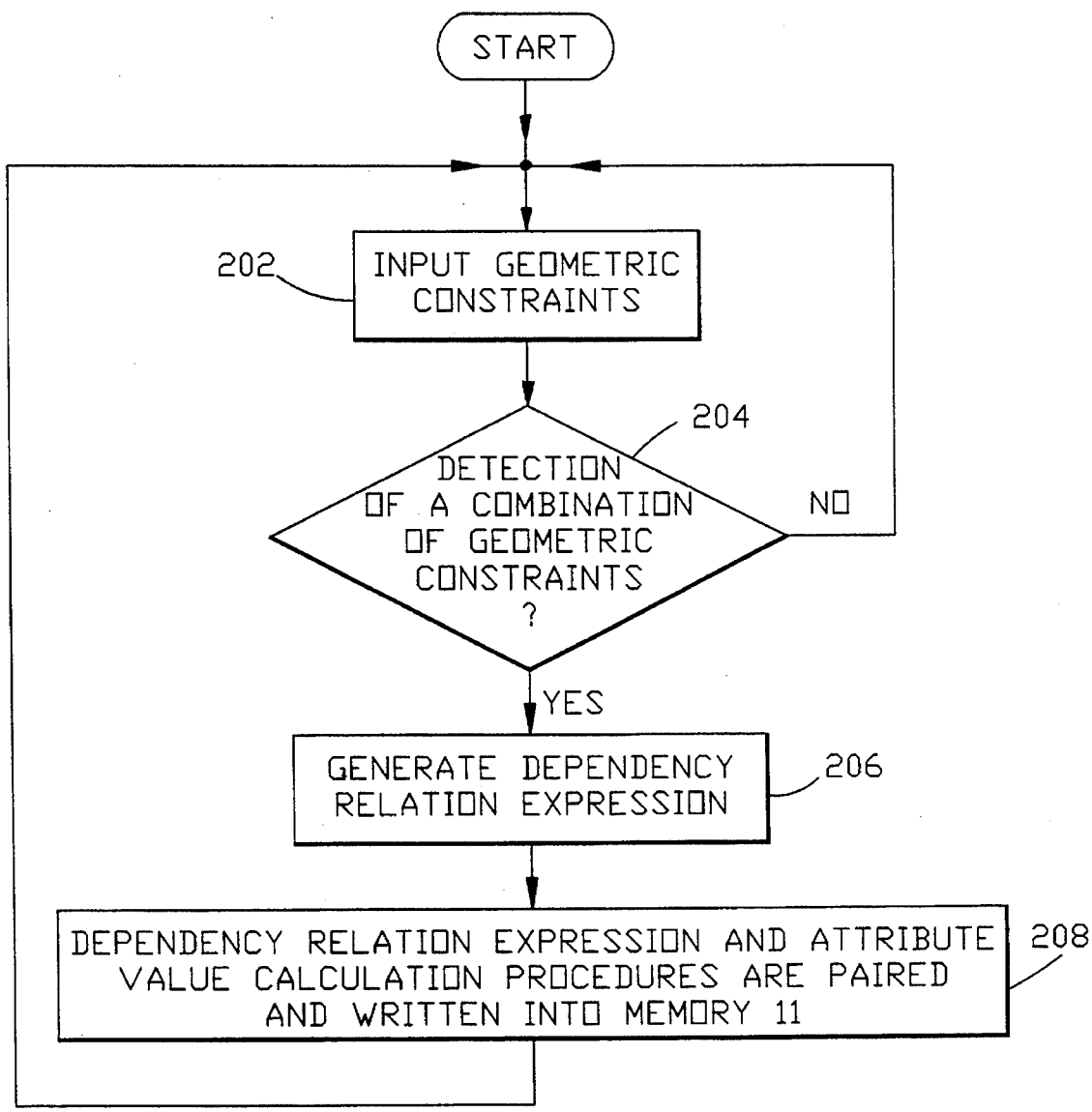
FIG. 2 is a flow diagram illustrating the operation of the dependency relation expression generating mechanism forming a portion of FIG. 1.

As shown in FIG. 2, with geometric constraints and geometric elements as an input (step 202), dependency relation expression generating mechanism 7 detects a combination of geometric constraints (step 204), and the process returns to the initial point if no such combination exists, and if such combination does exist, it is replaced by a bidirectional dependency relation expression (step 206).

Geometric constraints can be used to locally calculate part of a shape. For instance, if two planes are intersecting, the equation of the line of intersection can be calculated by the geometric constraint of "intersection" and the equations of the two planes. Also, if the distance between the planes is given, one plane can be determined by the geometric size constraint of "distance" and the equation of the other plane. In dependency relation expression generating mechanism 7, the local dependency relations of such geometric elements and geometric constraints are calculated and generated. In this calculation, a feedforward deduction using a rule base system is used.

Figure 3:
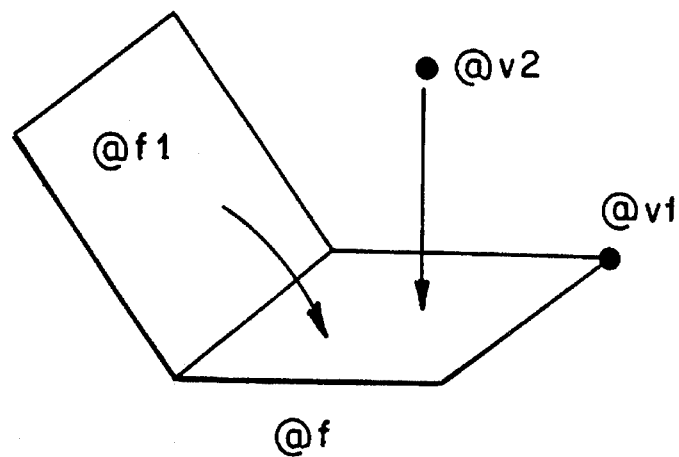
FIG. 3 illustrates an example of a combination of geometric constraints.

An example of the combination of geometric constraints for determining one plane and the rule for detecting the combination and calculating the dependency relation are shown in FIG. 3 and Table 2. A surface @f in FIG. 3 is provided with a point @v1 (on) on the surface, the distance (dist) from a point @v2 and the angle (angle) with a surface @f1.

TABLE 2

| Rule for Calculating Dependency Relation | | | |
|---|---|---|---|
| Condition part | IF | on (@v1, @f) & dist (@v2, @f) & angle (@f1, @f) | Geometric constraints |
| Action part | THEN | on (@v1, @f), dist (@v2, @f), angle (@f1, @f), @v1, @v2, @f1 · => @f | Dependency relation expression |

Geometric constraints are described in the form of a logical product in the condition module of the rule of Table 2, and in the execution module, a dependency relation expression representing the dependency relation is described. The dependency relation expression represents the logical product of the left-side elements supporting the right-side element. In this example, three constraints (on, dist, angle) and three geometric elements (@v1, @v2, @f1) are shown to support the surface @f, and the right side can be calculated from the left-side attribute values. Since the dependency relation expression is an expression which statically declares a dependency relation, it is unnecessary in the execution module of the rule to consider whether the attribute values of the geometric elements constituting the left side of the dependency relation expression have already been determined. This dependency relation expression and the procedure for calculating the attribute value of the right-side element from the left-side attribute values are paired off and written into memory 11 (FIG. 2, step 208). Dependency relation expression generating mechanism 7 repeats a similar processing. The procedure for calculating the attribute value is written into memory 11 as a set for each dependency relation expression, for instance, "Procedure 1," "Procedure 2."

Figure 4:
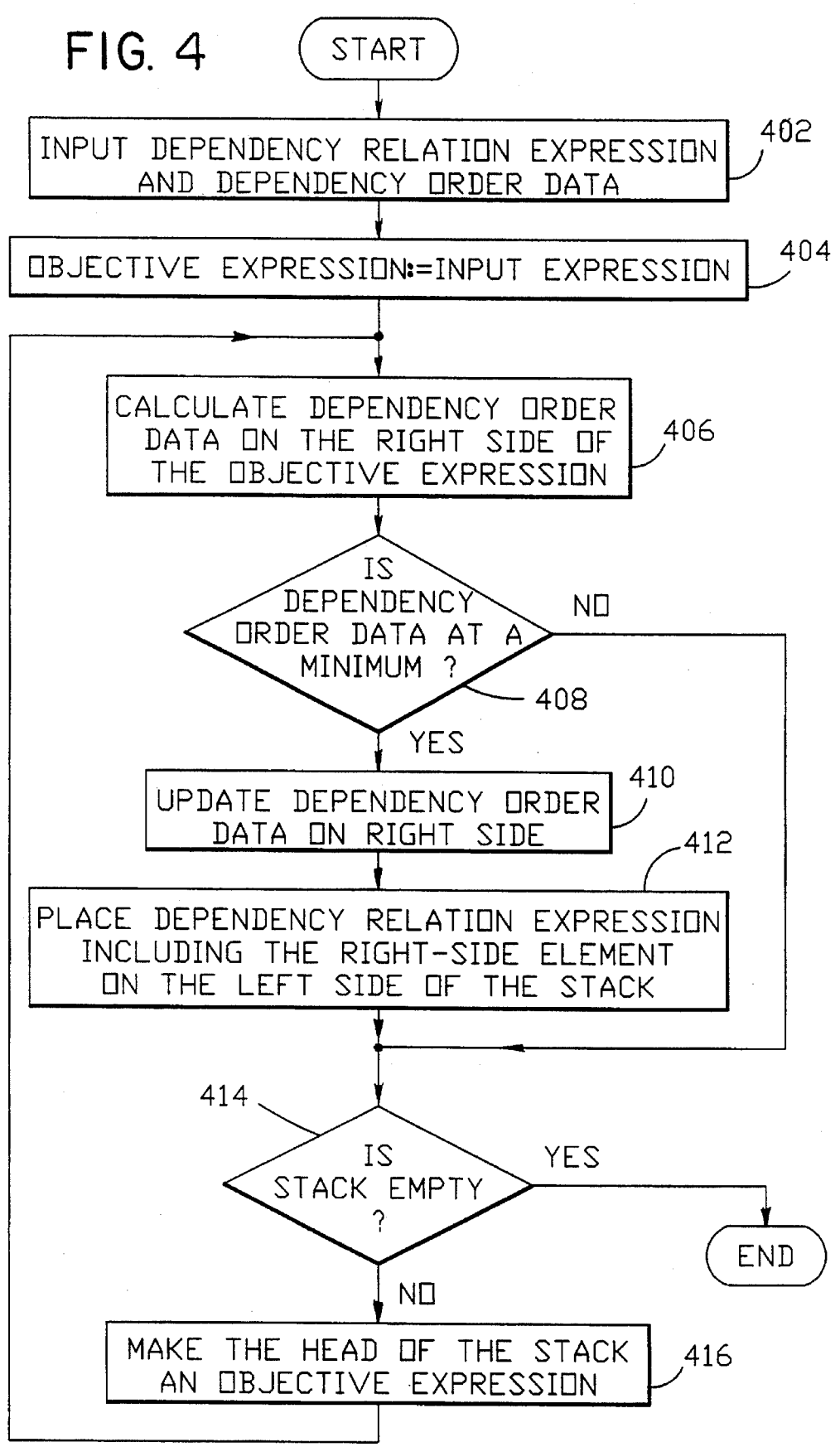
FIG. 4 is a flow diagram illustrating the operation of the dependency order calculating mechanism forming a portion of FIG. 1.

Then, the dependency order calculating mechanism 8 dynamically calculates the dependency condition (dependency order data) of the geometric elements using the dependency relation expression. As shown in FIG. 4, with the pair of the dependency relation expression and the attribute value calculation procedure and the dependency order data as an input (step 402), and with the input expression as the objective expression (step 404), the calculation of the dependency order data on the right side of the objective expression is done (step 406).

Figure 5:
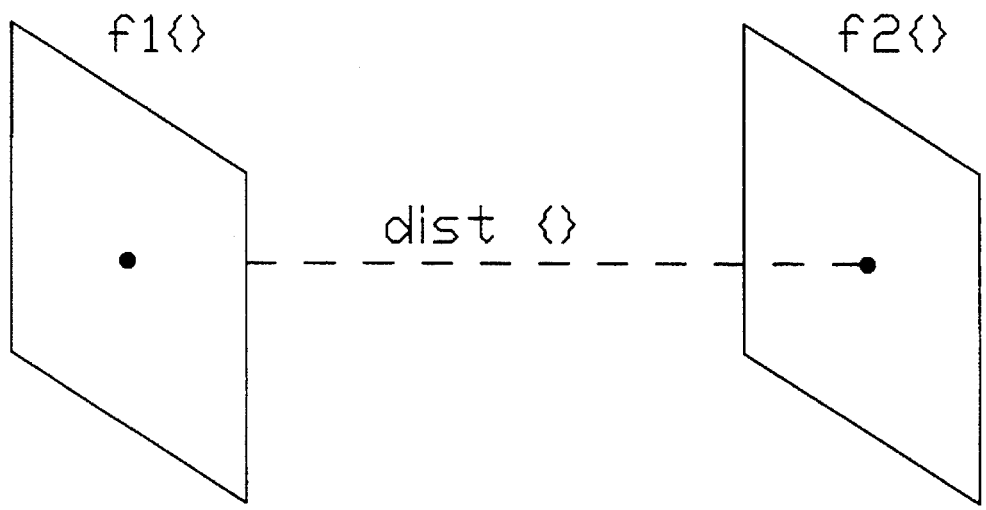
FIG. 5 illustrates an example of a distance constraint between two planes in the calculation of dependency order.

For instance, a restriction representing the distance between two planes f1 and f2 as shown in FIG. 5 is provided to the system, the following dependency relation expressions are issued by dependency relation expression generating mechanism 8.

FFdist, f1→f2.

FFdist, f2→f1.

The expressions indicate that, from a geometric constraint representing a distance and one plane, the other plane can be calculated.

In addition, the two expressions indicate a bidirectional property that the other plane can be determined from either plane ("bidirectional dependency relation expressions").

Here, the constraint representing the positional relation of the planes is omitted for simplicity. An ATMS assumption can be considered to be data which may be cancelled in due course. With the geometric constraint (FFdist) representing the distance of the planes as a derived-data, and with a geometric parameter (D) representing the distance as an assumption, the following relational expression is issued.

D→FFdist. (<FFdist, {{D}}>)

The geometric parameter declared as an assumption is purposely called an "assumption parameter." If one plane (f1) contains its equation (F), it is directly specified as an assumption parameter, F→f1. (<f1, {{F}}>)

The product ({{D, F}}) of the first left-side dependency order data of the previous dependency relation expression can be calculated.

Figure 6:
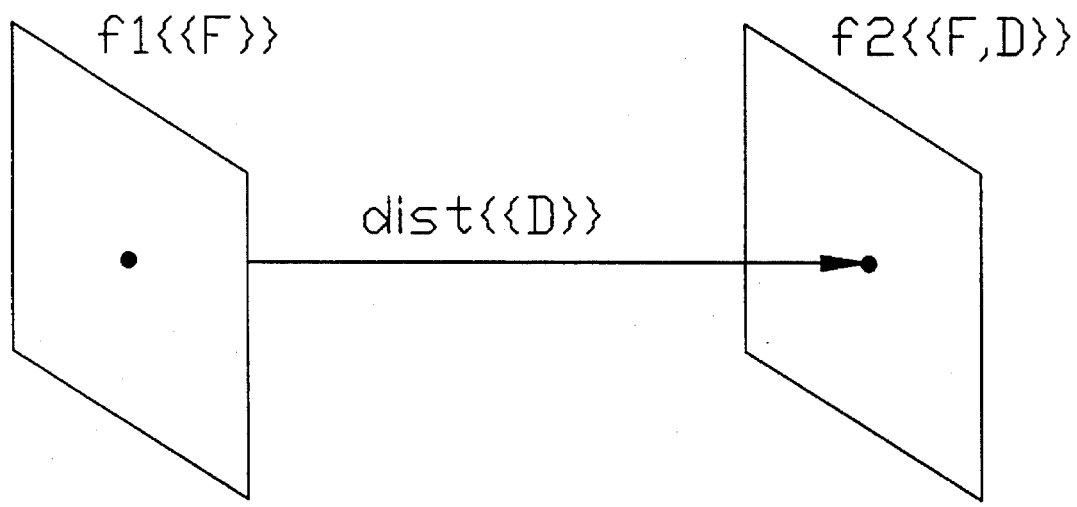
FIG. 6 illustrates an example of propagation of geometric constraints.

This product is added to the dependency order data of the right-side plane (f2) as shown in FIG. 6. (Propagation of a geometric constraint)

FFdist, f1→f2. (<f2, {{D, F}}>)

Then, it is determined whether the dependency order data is a minimum (step 408 in FIG. 4). If the answer is no, the process goes to step 414. If the answer is yes, the dependency order data of the right side which is held in memory 12 is updated (step 410). By updating the dependency order data, the product of the left-side dependency order data ({{D, F}}) in the second dependency relation expression can be calculated, but the dependency order data of the right side (f1) is not updated because of the minimum property of the dependency order data. This means that the geometric element (f2) which was supported by one geometric element (f1) and calculated does not re-support that element. Because of such a minimum property of the dependency order data, the directional property of the support relation is naturally given even by a dependency relation expression representing a bidirectional property.

Then, the dependency relation expression including the right-side dependency order data in its left side is placed on the stack within dependency order calculating mechanism 8 (step 412). Whether the stack is empty (step 414), and whether the process ends are empty are checked. If the stack is not empty, the head of the stack is made to be an objective expression (step 416) and the process returns to step 406.

Figure 7:
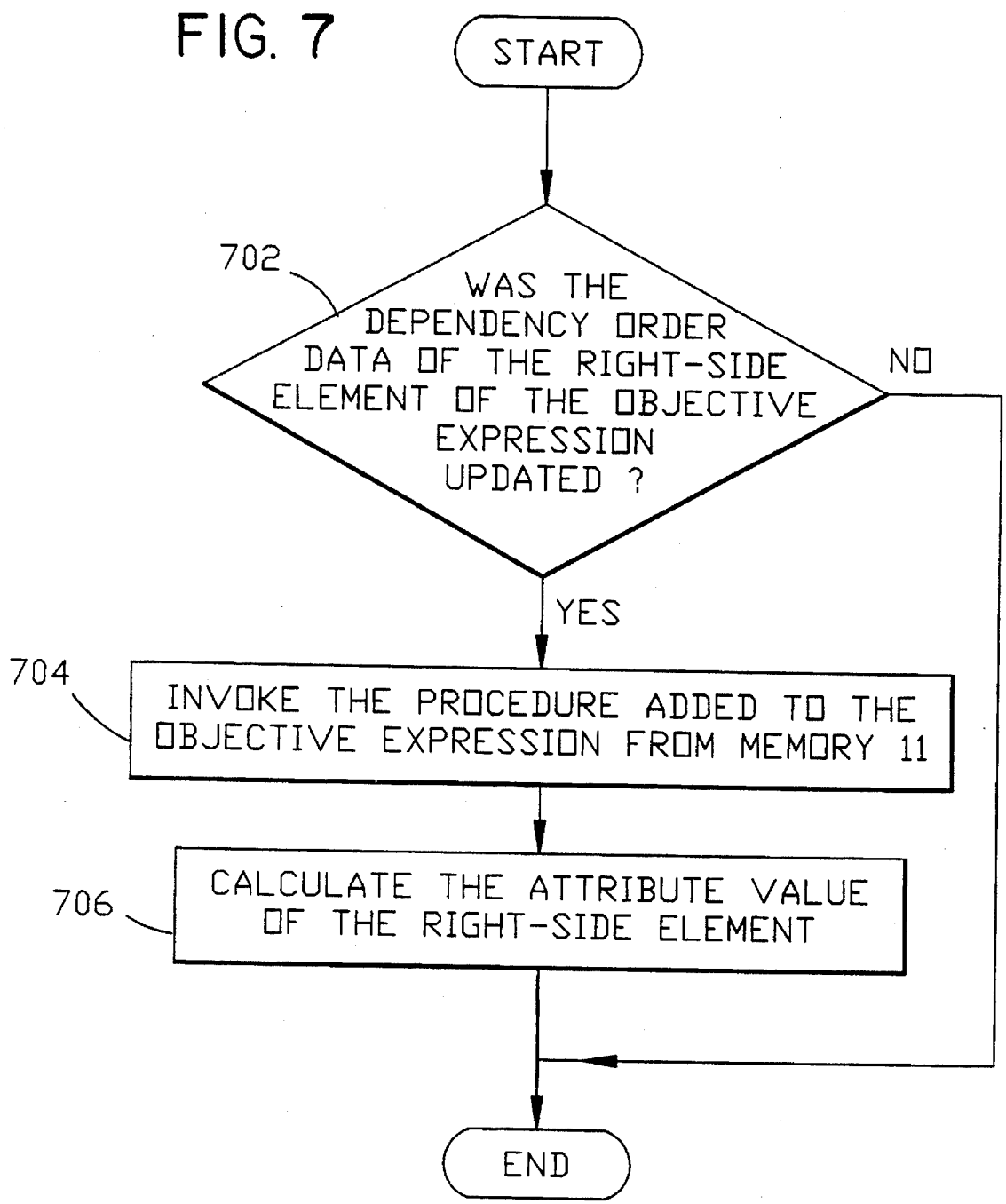
FIG. 7 is a flow diagram illustrating the operation of the geometric attribute calculating mechanism forming a portion of FIG. 1.

Geometric attribute calculating mechanism 9 invokes the attribute calculation procedure and calculates the attribute values (such as coordinates) for the geometric elements, the dependency order data of which was updated as a result of the evaluation of the dependency relation expression. That is, as shown in FIG. 7, whether the dependency order data of the right-side element of the objective expression was updated (step 702) is determined. If the answer is no, the process ends. If the answer is yes, the attribute calculation procedure added to the objective expression is invoked from memory 11 (step 704) to calculate the attribute value of the right-side element (step 706). Thus, the attribute calculation routine associated with the dependency relation expression by geometric attribute calculating mechanism 9 is executed only in the updating of the dependency order data of the right side element, thereby calculating the geometric parameters on the right side element. Making such a routine correspond to the dependency relation expression and performing the attribute value calculation along with the dependency order data is the first extension to ATMS.

The updating of the dependency order data of one node facilitates the (re)evaluation of the dependency relation expression containing it on the left side, and updates the dependency order data of another node. That is, geometric parameters (geometric constraints) propagate by the dependency relation expression. This behavior can be captured as the calculation of the attribute value by the propagation of the constraint.

Now, the modification process of geometric constraints will be described.

(1) Modification of geometric constraint parameters

To change the size which was previously given, change the value of the assumption parameter. For that, it is necessary to first deny the assumption. For instance, in FIG. 6, the assumption parameter (D) representing a distance is denied by the following dependency relation expression.

D→(<D, { }>)

Figure 8:
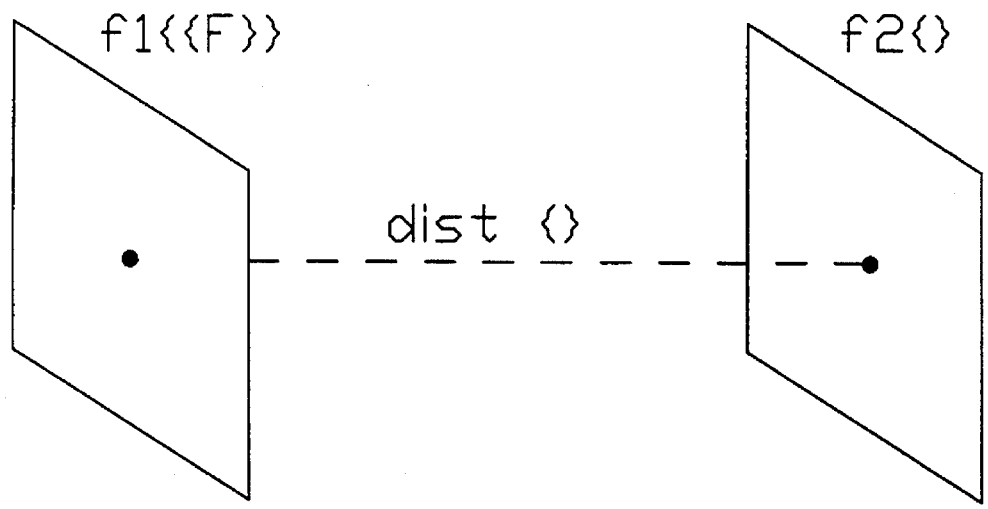
FIG. 8 illustrates an example of denial of an assumption parameter D for changing the value of a geometric constraint.

Whereupon, by consistency of the dependency order data, the geometric constraint (FFdist) representing a distance and the dependency order of one plane (f2) become empty. This state is shown in FIG. 8.

<FFdist, { }>, <f2, { }>.

Then, an assumption parameter (D') representing the value of a new distance is declared to support a geometric constraint.

D'→FFdist.

Figure 9:
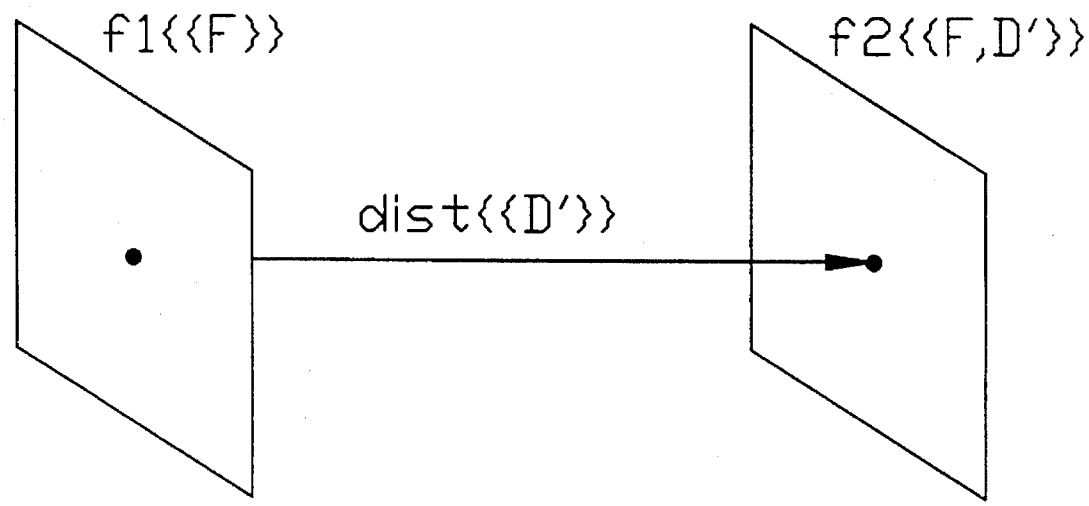
FIG. 9 illustrates an example of the addition of an assumption parameter D'.

By this dependency relation expression, the dependency order data propagates to the geometric constraint (FFdist) and the plane (f2) as before, as shown in FIG. 9.

<FFdist, {{D'}}>. <f2, {{D', F}}>.

And, the calculation procedure for attribute values is invoked from memory 11 when the dependency order data is updated, and the attribute values of the geometric elements are recalculated. (See FIG. 4.)

(2) Mechanism for detecting and resolving conflicts of geometric constraints

Conflict detecting and resolving mechanism 10 shall now be described. If two or more attribute values are assigned to one geometric element, the geometric constraints are excessive and a shape cannot be uniquely determined. In such a case, conflict detecting and resolving mechanism 10 calculates the geometric constraint which must be cancelled to leave one attribute value at most.

As shown in FIG. 10, conflict detecting and resolving mechanism 10 first reads the geometric attribute values assigned to one geometric element from memories 12 and 14 (step 1002). Then, whether two or more attribute values are assigned (step 1004) is determined. If the answer is no, the process ends. If the answer is yes, a calculation is performed using a Boolean algebraic expression. That is, the dependency order data given to each geometric element represents a cause which supports that geometric element, and the candidate of the cause (geometric constraint) to be cancelled can be calculated. The product of two sets of dependency order data having different values is calculated (step 1006), and the sum of the individual dependency order data are used to form a disjunctive normal form (step 1008), which is then transformed to a conjunctive normal form (step 1010). Each term of the conjunctive normal form is outputted as a cancellation candidate of a geometric constraint which must be cancelled to resolve the conflict of geometric constraints (step 1012). The process returns to the initial step if there is a cancellation input (step 1014).

Figure 11:
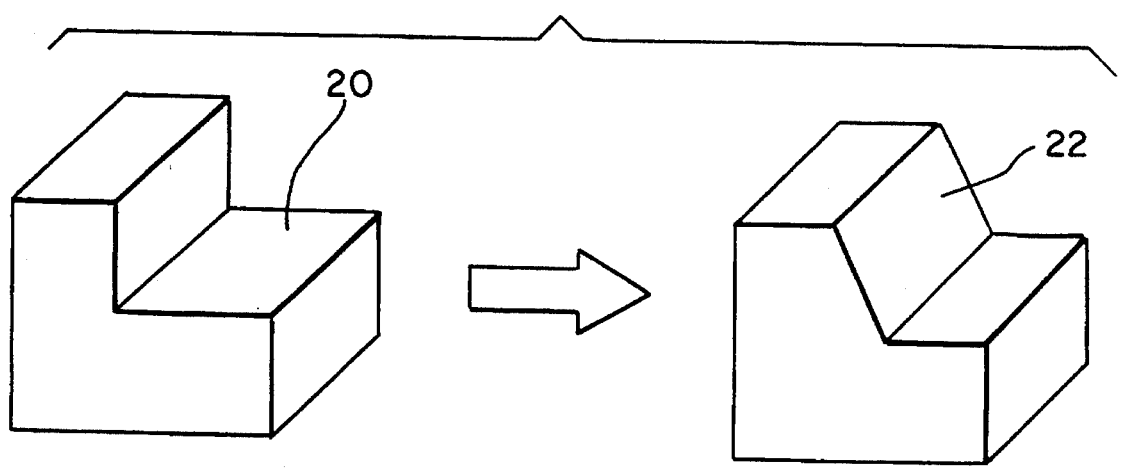
FIG. 11 illustrates a modification made to a figure.

The process used in detecting and resolving excessive constraints will now be described in detail. First, as shown in FIG. 11, to change the portion to which a size is given rather than to change the value of size, it is necessary to add/delete a geometric constraint. For instance, it may be desired to change a step from a vertical cut such as 20 to an oblique cut such as 22. Such status occurs when the design specification is changed, but it also occurs when the system uses predetermined values. Predetermined values are very effective in reducing the cumbersome constraint specification (input) by the designer. For instance, to cut a step, if only one side of the base is specified, the structural constraints such as coincidence between planes can automatically be provided by the system. Also, appropriate predetermined values can be provided related to the size constraints such as the depth and width of the step.

To change a predetermined value, it is only necessary to change the assumption parameter. However, if a constraint different from the constraint given as a predetermined value and priority is given to it, it is required to delete the geometric constraints of the predetermined value and add new geometric constraints. The reason for this is that those constraints may "conflict" with each other and as a result cause a plurality of parameters to correspond to a geometric element.

Figure 12:
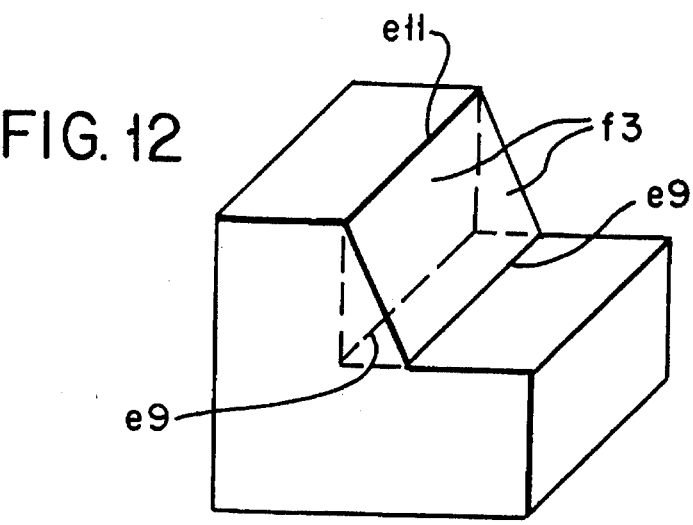
FIG. 12 illustrates a conflicting state of geometric constraints.

An example is shown in FIG. 12 in which two interpretations occurred in the shape as a result of excessive constraints. Two determinations were made for plane f3, e9 and e11, respectively. In FIG. 12, two attribute values are assigned to the lower side e9. The attribute values correspond to two environments in the dependency order data, respectively. For the upper side e11, two environments exist in the dependency order data, but if the respective attribute values are assumed to be the same value, it can be deemed that constraints "conflict" in side e9 and constraints are "excessive" in side e11. If constraints are excessive in all the geometric elements, there is no particular problem because the attribute values of the geometric elements are uniquely assumed. However, if constraints are conflicting for at least one geometric element, it should be resolved.

(3) Process for detecting and resolving conflicts in geometric constraints

In the example of FIG. 12, the designer may probably be able to detect which geometric element is the cause of conflict. However, it becomes difficult for the designer to discover which constraints are conflicting as the design objective becomes complicated. Specifically, since constraints that are not intended by the designer are automatically provided in a system utilizing predetermined values, the function used to detect and resolve such conflicts increasingly becomes necessary.

To detect and resolve conflicts in the geometric constraints, a second extension was applied to ATMS. First, a construction was prepared in which attribute values were provided to the environments of the dependency order data, respectively. The attribute values are not associated with nodes (data such as geometric elements), but associated with the environments of the dependency order data. A second advantage is that the number of nodes and dependency relation expressions do not increase when a conflict or redundancy occurs. This node structure is described as follows.

<Data, {Environment: Attribute value, ... }>

Conflict detection can be done as follows. If one node has a plurality of environments in the dependency order data, it is found that constraints are redundant or conflicting. The constraints are redundant if the comparison of the attribute values corresponding to the individual environments indicates the same value for all, and they are conflicting if there are any constraints having no identical value. An example of a conflict is shown below.

<x, {{A}:10, {B, C}:20, {B, D}:30}>

In this example, it is seen that assumption parameters are conflicting because data x has a plurality of causes and different attribute values corresponding to the individuals.

Next, the resolution of a conflict is explained. To resolve the conflict, any of the conflicting assumptions is denied. Which assumption is to be cancelled can be calculated as follows. In order to cause at least one of the attribute values 10 through 20 to end in failure in the above example, it is only needed to deny at least one of the assumptions A, B or C. This is written by a Boolean algebraic expression as shown below.

$ABC=0$

Similarly, the following expressions are provided for 20 and 30, and 30 and 10.

$ABD=0, BCD=0$

These three expressions constitute the following disjunctive normal form when gathered into one expression.

$ABC+ABD+BCD=0$

This expression is transformed to conjunctive normal form as shown by the following expression.

$B(A+C)(A+D)(C+D)=0$

This transformation can also readily be calculated in a computer using DeMorgan's theorem, by denying the whole, removing the parentheses, and again denying. From the last expression, it is found that, to solve the conflict of data x, it is only needed to deny B, or A and C, or A and D, or C and D. To resolve the conflict for all the design objectives, it is only necessary to make disjunctive normal forms of the geometric elements.

The assumption to be denied which was obtained here is the condition for resolving the conflict. By denying the obtained assumption, the dependency order data of the geometric elements may become empty, or the attribute values may disappear.

Enabling a conflict to be detected and a start to resolving the conflict to be provided to the designer as an assumption parameter candidate to be denied, is the third extension to ATMS.

Figure 13:
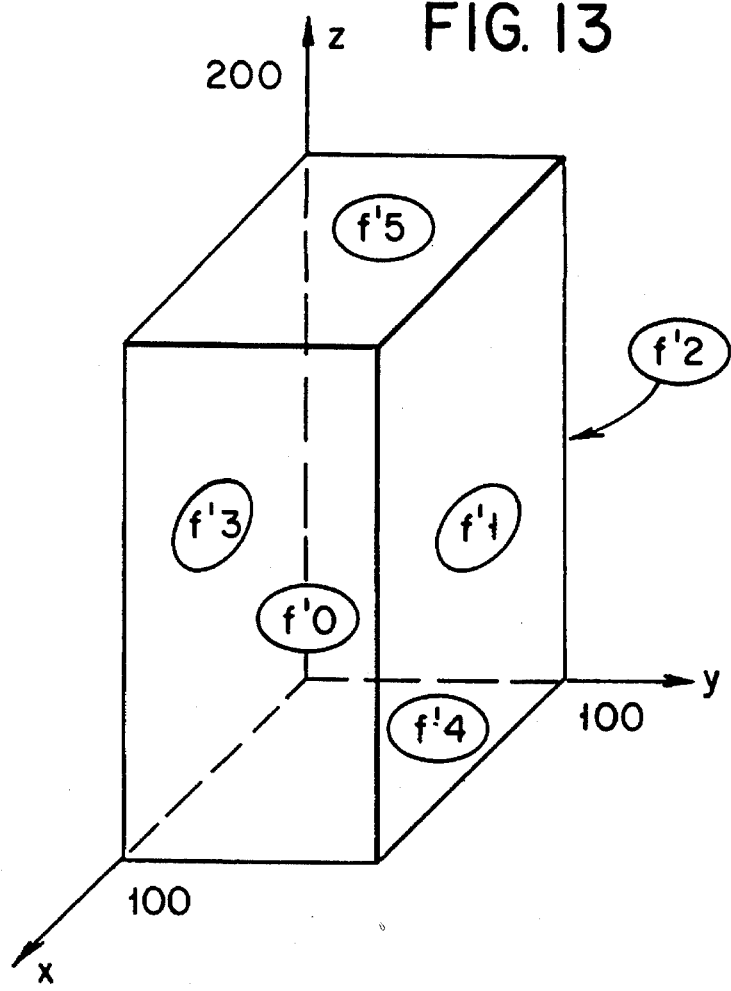
FIG. 13 illustrates a basic block before change of geometric constraints.

The examples shown in FIGS. 11 and 12 will now be reconsidered. First, it is assumed that the solid block becoming the base has already been determined and its six planes have the following dependency order data and plane attribute values as shown in FIG. 13. A plane attribute value is (a point on the plane) +(a normal vector).

<f0', {{F0}:=(100, 0, 0)+(1, 0, 0)}>

<f1', {{F1}: =(0, 100, 0)+(0, 1, 0)}>

<f2', {{F2}: =(0, 0, 0)+(−1, 0, 0)}>

<f5', {{F5}: =(0, 0, 200)+(0, 0, 1)}>

Figure 14:
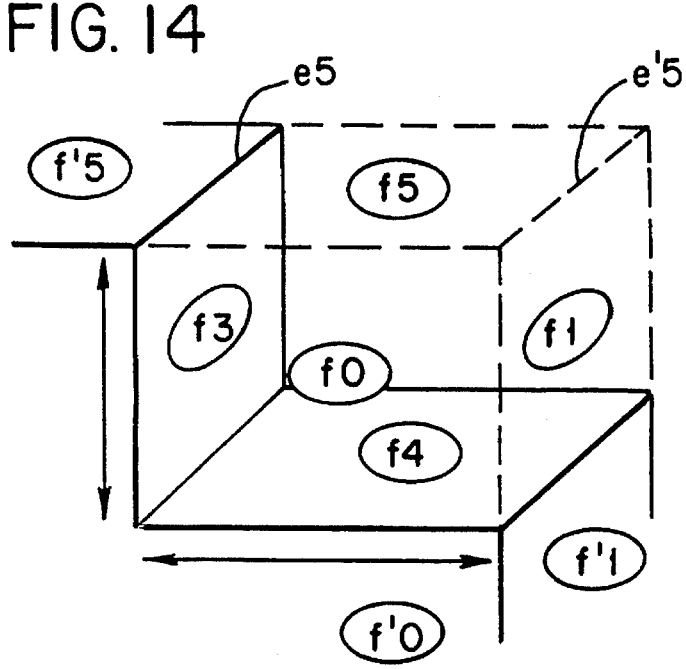
FIG. 14 illustrates a state in which a vertical step is cut in the block of FIG. 13.
Figure 15:
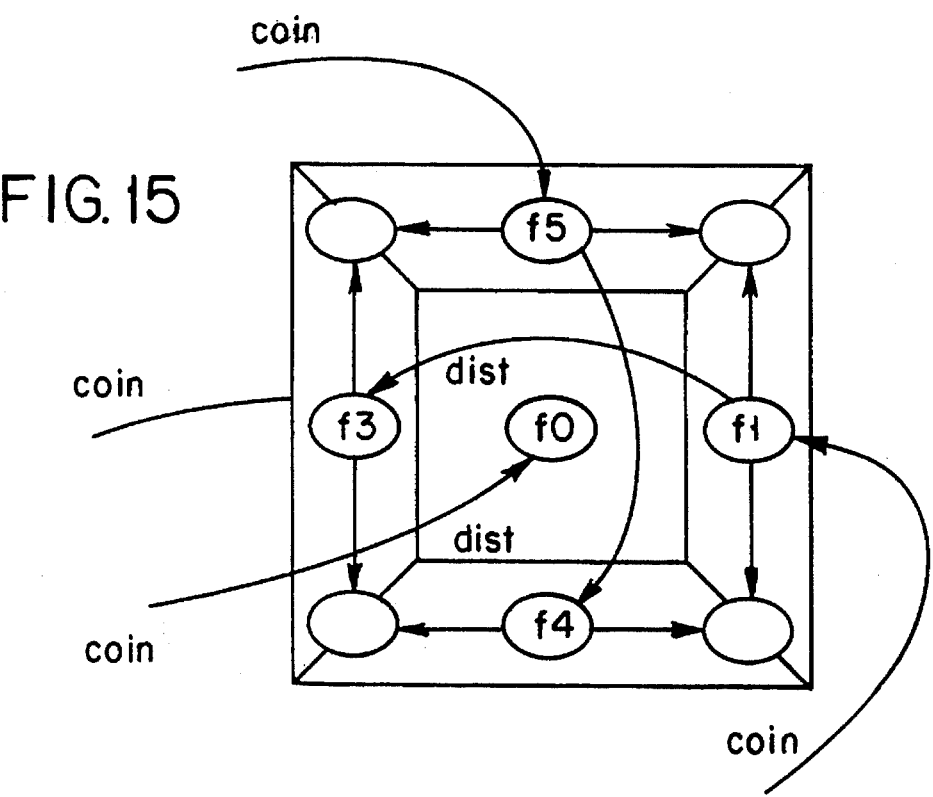
FIG. 15 is a representation in which geometric constraints are assigned to the block of FIG. 14.

To cut a step for the block as shown in FIG. 14, the following geometric constraints such as plane coincidences (coin) and inter-plane distances (dist) as shown in FIG. 15 are assumed. It is further assumed that plane coincidences are parameters (B6, B7, B8, B9) taking two values, true and false, and distances are parameters (D10, D11) taking a real number. For instance, B6 indicates the coincidence (coin) of plane f0'and plane f0, and D10 indicates the distance (dist) between plane f1 and plane f3.

B6→coin (f0', f0), B7→coin (f1',f1),

B8→coin (f2',f2), B9→coin (f5',f5),

D10→dist (f1, f3), D11→dist (f4, f5).

The above dependency relation expressions and other dependency relation expressions issued by the dependency relation expression generating mechanism are evaluated to determine the attribute values of the geometric elements of the step. Part of it is shown below.

<f3, {{F1, B7, D10}:=(0,60, 200)+(0, 1, 0)}>

<e9, {{F1, F5, B7, B9, D10, D11}:=(0, 60, 150)+(−1, 0, 0)}>

<e11, {{F1, F5, B7, B9, D10}:=(0, 60, 200)+(1, 0, 0)}>

Figure 16:
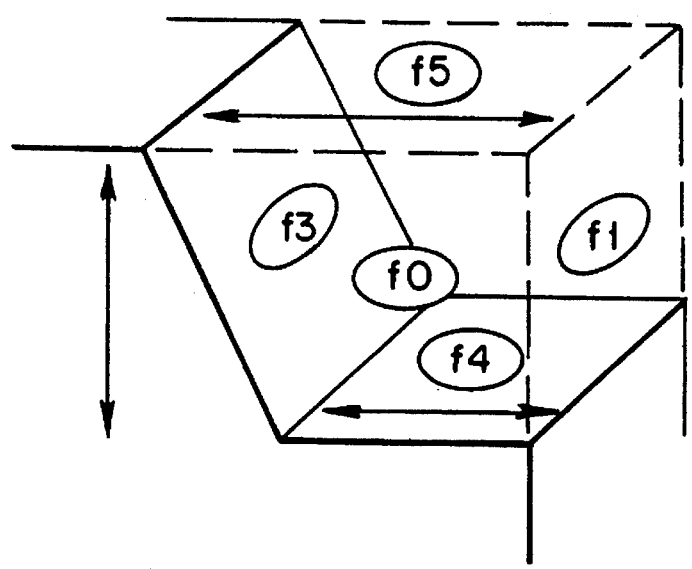
FIG. 16 illustrates an oblique step cut in the block of FIG. 13.
Figure 17:
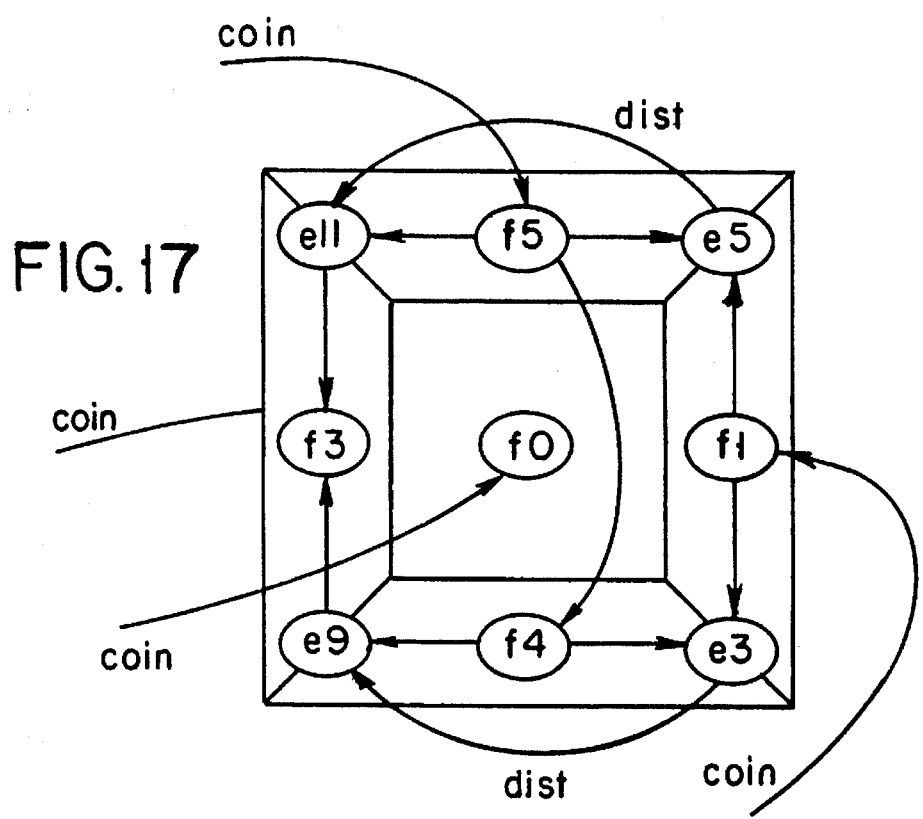
FIG. 17 is a representation in which geometric constraints are assigned to the block of FIG. 16.

As stated above, it is also possible that the system can be made to automatically provide appropriate geometric constraints along with predefined values by specifying one side (e5') of the block and one side (e5) of the step. If the intention of the designer is to cut an oblique step as shown in FIG. 16, geometric constraints (dist) representing the distances between sides e3 and e9 and sides e5 and e11 and a dependency relation expression are added as shown in FIG. 17

D12→dist (e3, e9), D13→dist (e5, e11).

Then, the dependency order data and parameters of the geometric elements of the step become conflicting (f3, e9) or redundant (e11) as follows.

| | |
|---|---|
| <f3, | {{F1, B7, D10}: = (0, 60, 200) + (0, 1, 0)}, |
| | {F1, F5, B7, B9, D11, D12, D13}: = |
| | (0, 60, 200) + (0, 0.981, 0.196)}} > |
| <e9, | {{F1, F5, B7, B9, D10, D11}: = |
| | (0, 60, 150) + (−1, 0, 0)}, |
| | {F1, F5, B7, B9, D11, D12}: = |
| | (0, 70, 150) + (−1, 0, 0)}} > |
| <e11, | {{F1, F5, B7, B9, D10}: = |
| | (0, 60, 200) + (1, 0, 0)}, |
| | (F1, F5, B7, B9, D13}: = |
| | (0, 60, 200) + (1, 0, 1)}} > |

Through the addition of these constraints, two paths have been provided to the order relation of support. If the previously shown calculation used for resolving the conflict is done in this state, the following result is obtained.

F1 F5 B7 B9 D10 D11 D12=0

There are six assumptions: assumptions (F1, F5) for supporting the planes of the base, assumptions (B7, B9) for supporting the coincidence of the planes, assumptions (D10, D11) of the inter-plane distance, and assumption (D12) between the sides. If the number of the geometric elements for which dependency order data become empty is counted when the individual assumption parameters are denied, the following result is obtained.

| | |
|---|---|
| {F1} . . . 27. | {F5} . . . 27. |
| {B7} . . . 18. | {B9} . . . 18. |
| {D10} . . . 0. | {D11} . . . 9. |
| {D12} . . . 0. | |

To deny the planes of the base means that the basis supporting the geometric elements of the step is denied. There will naturally be no conflict if dependency order data becomes empty, but this is not a desired result. Assumptions which make the dependency order data of many geometric elements empty when it is denied are considered to be close to such a basis. Accordingly, it is preferable to cancel assumptions which never make the dependency order data of the geometric elements empty even if they are denied. In this example, there are two such assumptions (D10, D12). If assumption (D10) is a predefined value provided by the system, it may automatically be denied. If one assumption (D10) of the two assumptions is denied, the geometric elements assume a state of no conflict as shown below because of consistency in the dependency order data.

<f3, {{F1, F5, B7, B9, D11, D12, D13}:=(0, 60, 200)+(0, 0.981, 0.196)}}>

<e9, {{F1, F5, B7, B9, D11, D12}:=(0, 70, 150)+(−1, 0, 0)}}>

<e11, {{F1, F5, B7, B9, D13}:=(0, 60, 200)+(1, 0, 0)}}>

In this way, the left step 20 in FIG. 11 can be changed to the right step 22.

Although examples of the geometric modeling of three-dimensional structures have been described above, it will be understood by those skilled in the art that the present invention is also applicable to the modeling of two-dimensional models.

In addition, it is also possible to express a basic curved surface using the information relating to geometric constraints in Table 1. For instance, for a circular cylinder, it is only needed to define the diameter by the distance from the central axis (line) and add the upper and lower planes. For a sectional figure, provision of the angle between the two planes will suffice.

Figure 18:
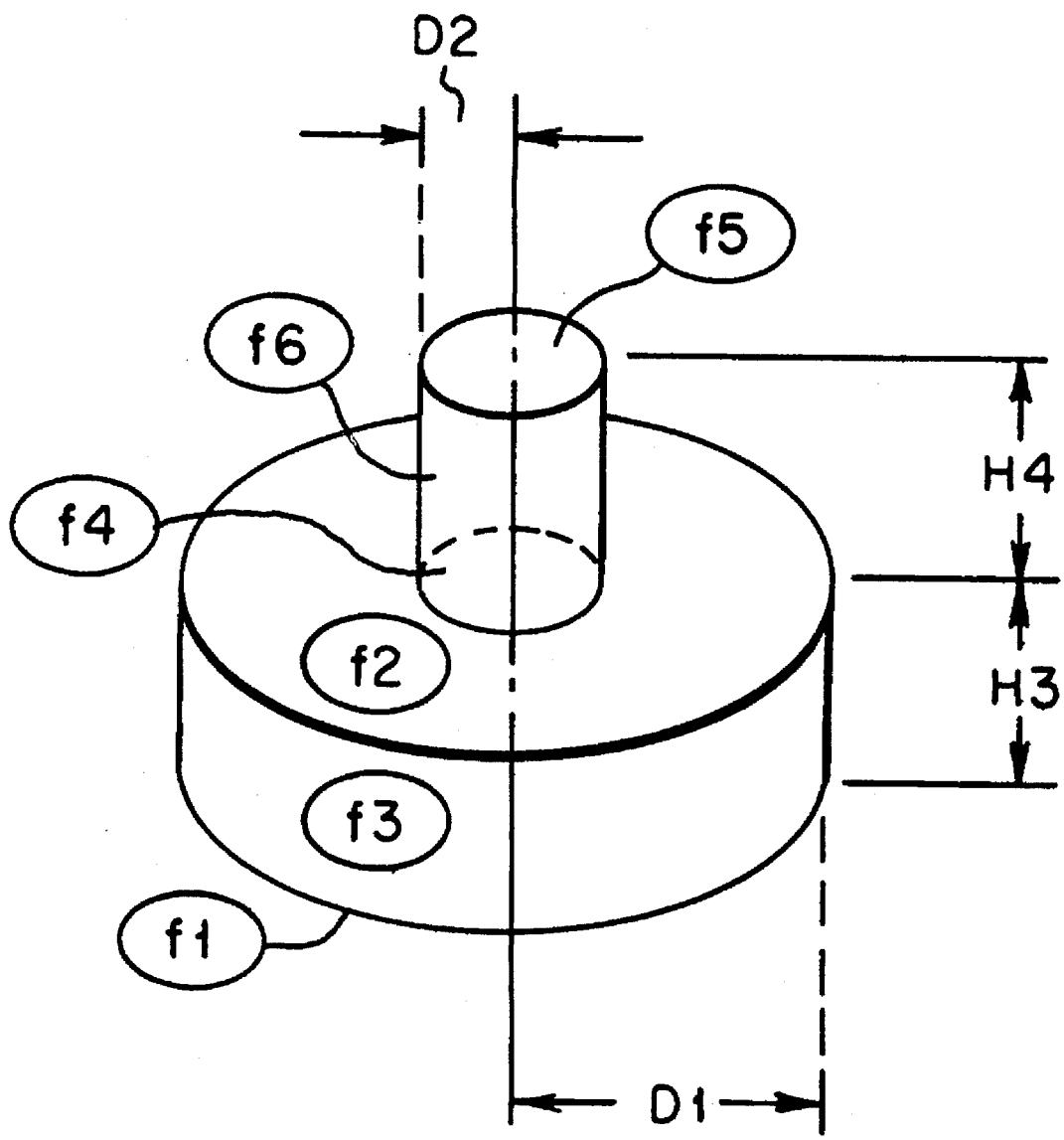
FIG. 18 illustrates a stepped circular cylinder of different diameters to be modeled in accordance with the present invention.

For instance, as shown in FIG. 18, considering the case in which a stepped circular cylinder of different diameters is obtained by connecting two basic circular cylinders, a circular cylinder becoming the first basic circular cylinder is obtained by first defining a plane f3 with a distance D1 from the central axis and providing upper and lower planes f1 and f2 having a distance (height) H3. Then, the second circular cylinder is obtained by defining a plane f6 with a distance D2 using the same central axis, causing a lower plane f4 to coincide with f2, and defining an upper plane f5 through a distance H4 from the lower plane f4, whereby a desired stepped circular cylinder is obtained.

Incidentally, by defining a two-dimensional model using the above described constraints, and raising or rotating the model, it is also possible to obtain the geometric modeling of a three-dimensional structure including curved surfaces other than circular cylinders.

A method has been described in which the geometric constraints provided between the geometric elements are replaced by a dependency relation expression of ATMS, and the parameters of the geometric elements are calculated using a declarative graph constituted from the expression, whereby the calculation for detecting and resolving a conflict is performed. Another algorithm can also be used by which a bidirectional dependency relation is obtained which is similar to this ATMS. For instance, formalization can be made a problem on a graph with the geometric elements as a code and the constraint relation as an arc, but this method is inferior to ATMS with respect to efficiency and conflict detection.

In accordance with the present invention, the calculation of actual coordinate values, and the judgement or calculation as to which portion of a shape is affected by a certain size change can be omitted, all of which were required for the designer to do in inputting/changing the shape in the traditional geometric modeling system. The method of giving geometric attribute values is also flexible when one shape is determined or modified. Moreover, if a conflict occurs in the geometric constraints given by a modification or the like, the measure for resolving the conflicting constraints is presented to the designer. Thus, the burden to the designer can be substantially reduced.

While there has been described and illustrated a preferred method and apparatus for generating geometric models, it will be apparent to those skilled in the art that modifications and variations are possible without deviating from the broad principle of the present invention which shall be limited solely by the scope of the claims appended hereto.

What is claimed is:

1. An apparatus for generating a two- or three-dimensional geometric model comprising:

means for generating bidirectional dependency relation expressions from geometric constraints between a plurality of geometric elements;

means for obtaining a dependency condition of said geometric elements using said bidirectional dependency relation expressions;

means for determining an attribute value for each said geometric element from said dependency condition; and means for generating a two- or three-dimensional model from said geometric elements and said attribute values thereof.

2. An apparatus for generating a two- or three-dimensional geometric model comprising:

means for obtaining a dependency condition for each one of a plurality of geometric elements using bidirectional dependency relation expressions between geometric elements;

means for detecting a conflict among said dependency conditions and automatically displaying for possible cancellation at least one dependency condition that will upon cancellation resolve said conflict among said dependency conditions;

means for determining an attribute value for each geometric element from said dependency condition for said each geometric element;

means for generating, upon resolution of any conflict among said dependency conditions, a two- or three-dimensional object from said geometric elements and the attribute values thereof.

3. A computer implemented process for use in a system comprising a processor and a program memory connected to said processor and including instructions for operating said processor, comprising the steps of:

storing in said program memory a set of geometric elements to define an object topology;

storing in said program memory geometric constraints between the geometric elements;

determining and storing in said program memory bidirectional dependency relation expressions between the geometric elements;

determining and storing in said program memory dependency conditions of said geometric elements using said stored bidirectional dependency relation expressions;

assigning and storing in said program memory an attribute value determined from said stored dependency conditions for each said geometric element; and constructing a model of the object from said stored geometric elements and said stored attribute values.

4. A computer implemented process as set forth in claim 3 and further comprising the step of:

if more than one attribute value is assigned for a respective geometric element, extracting from the program memory the geometric constraints between said geometric elements which have caused such assignment of more than one attribute value for said respective geometric element as geometric constraint candidates for possible cancellation.

5. An apparatus for generating a geometric model comprising:

input means;

display means;

processing module means for generating a geometric model on said display means in accordance with the inputting of a command and data in said input means;

said processing module means including:

means, responsive to geometric elements of an inputted figure and data concerning constraints between the geometric elements, for generating bidirectional dependency relation expressions for each geometric element;

means for obtaining dependency order data supporting each geometric element and obtaining an attribute value of each said geometric element from said bidirectional dependency relation expressions; and model generating means for generating a geometric model from each said geometric element and the attribute value thereof.

6. An apparatus for generating a geometric model as set forth in claim 5 wherein said dependency order data is obtained through an assumption-based truth maintenance system using said bidirectional dependency relation expressions as an input.

7. An apparatus for generating a geometric model where, by means of a geometric model generating and processing unit comprising input means, a processing module and display means, a geometric model is generated on the display means in accordance with the inputting of a command and data, comprising:

means for inputting data related to a plurality of geometric elements and relative constraints between said geometric elements;

dependency relation generating means for converting said input data to a bidirectional dependency relation expression for each geometric element;

dependency order generating means for obtaining from said bidirectional dependency relation expression dependency order data supporting each said geometric element;

geometric attribute generating means for obtaining an attribute value of each geometric element from said dependency order data and said bidirectional dependency relation expression;

means for generating a geometric model from each said geometric element and the attribute value thereof; and conflict resolution means which, when a plurality of conflicting attribute values are assigned to one geometric element by said geometric attribute generating means, uses Boolean algebra to extract the constraint between the geometric elements which causes said conflicting attribute values as a candidate for cancellation.

8. An apparatus for generating a geometric model as set forth in claim 7 wherein when any change in the data related to a relative constraint between geometric elements is provided by said input means or by said conflict resolution means, the geometric element to be changed is obtained from said dependency order data and said bidirectional dependency relation expression to determine a new attribute value.

9. An apparatus for generating a geometric model comprising input means, a processing module including a processor and a memory, and display means, wherein a geometric model is displayed on the display means in accordance with the inputting of a command and data, said processing module comprising:

a first memory for storing input data related to inputted geometric elements and constraints between the geometric elements;

a dependency relation generating mechanism which converts said input data to a bidirectional dependency relation expression between the geometric elements using a rule base system;

a second memory for storing said bidirectional dependency relation expression;

a third memory for storing dependency order data;

a dependency order generating mechanism for obtaining an updated dependency order data corresponding to said input data from said bidirectional dependency relation expressions and said dependency order data;

a geometric attribute generating mechanism for obtaining attribute values of the geometric elements from said updated dependency order data;

a fourth memory for storing attribute values of said geometric elements, and model generating means for generating a geometric model from said updated dependency order data and said attribute values of the geometric elements.

10. A computer implemented process for generating a two- or three-dimensional geometric model comprising:

obtaining bidirectional dependency relation expressions from constraints between given geometric elements and using said bidirectional dependency relation expressions to obtain a dependency condition of the geometric elements;

obtaining an attribute value for each element from said dependency condition; and generating a two- or three-dimensional object from each said element and the attribute value thereof.

11. A computer implemented process for generating a geometric model as set forth in claim 10 further comprising:

detecting a conflicting dependency condition in said bidirectional dependency relation expressions;

obtaining a cancellation candidate of the constraint between the geometric elements to resolve the conflicting dependency condition; and obtaining an attribute value of each geometric element from cancelling said conflicting dependency condition.

12. A computer implemented process for generating a two- or three-dimensional geometric model comprising:

storing a plurality of inputted geometric elements of a figure, geometric constraints for the geometric elements, and bidirectional dependency relation expressions between the geometric elements;

obtaining an attribute value for each element from said bidirectional dependency relation expressions; and generating a geometric model from each said geometric element and the attribute value thereof.

13. A computer implemented process for generating a geometric model as set forth in claim 12 where when a change occurs in the geometric constraints between said geometric elements on the basis of a correction input, a geometric element to be changed is obtained from dependency order data and said bidirectional dependency relation expressions to determine an updated attribute value.

14. A computer implemented process for generating a geometric model where by a graphic processing unit comprising input means and a processing module and display means, a geometric model is generated on the processing module and display means in accordance with inputting of a command and data, comprising the steps of:

inputting data related to a plurality of geometric elements and relative constraints between said geometric elements;

generating a bidirectional dependency relation expression for each geometric element from the inputted data related to a plurality of geometric elements of a figure and the relative constraints between the geometric elements;

obtaining dependency order data supporting each said geometric element from said bidirectional dependency relation expressions, and an attribute value for each element; and generating a geometric model from each said geometric element and the attribute value thereof.

15. A computer implemented process for generating a geometric model as set forth in claim 14 where said bidirectional dependency relation expressions is an input and said dependency order data is generated by an an assumption-based truth maintenance system.

16. An interactive computer implemented process for generating a geometric model where, by a generated geometric model and processing unit comprising input means, a processing module having a processor and a memory, and display means, a geometric model is generated and displayed on the display means in accordance with input information such as a command and data, comprising the steps of:

generating a geometric model by executing a geometric reasoning in the processing module from the command and data inputted from the input means with regard to geometric elements of a figure and attribute values thereof;

displaying said geometric model on said display means;

when a plurality of attribute values are assigned to one geometric element from said input means extracting a constraint between said geometric elements causing such assignment as a candidate constraint to be cancelled and displaying said candidate constraint on said display means; and generating and displaying on said display means a geometric model generated after cancellation of said candidate constraint by an interactive input.

17. A computer implemented process for generating a geometric model where, by a geometric model generating and processing unit comprising input means, a processing module and display means, a geometric model is generated on the display means in accordance with a command and data, comprising:

a first inputting data related to a plurality of geometric elements and relative constraints between said geometric elements;

generating a dependency relation for converting said input data to a bidirectional dependency relation expression for each geometric element;

generating a dependency order for obtaining dependency order data supporting each said geometric element from said bidirectional dependency relation expression;

generating a geometric attribute for obtaining an attribute value of each geometric element from said dependency order data and said bidirectional dependency relation expression;

generating a geometric model from each said geometric element and the attribute value thereof; and a conflict resolution step which, when a plurality of conflicting attribute values are assigned to a geometric element by said generating a geometric attribute, using Boolean algebra to extract a constraint between said geometric elements which causes such conflict as a candidate to be cancelled.

18. A computer implemented process for generating a three-dimensional geometric model comprising:

obtaining bidirectional dependency relation expressions from constraints between geometric elements of a given object and using said bidirectional dependency relation expressions to obtain dependency conditions of the geometric elements;

obtaining an attribute value of each element from said dependency conditions;

generating a two-dimensional model from the attribute value of each said element; and rotating said two-dimensional model to generate a three-dimensional model including a curved surface.

* * * * *